Aug. 4, 1964

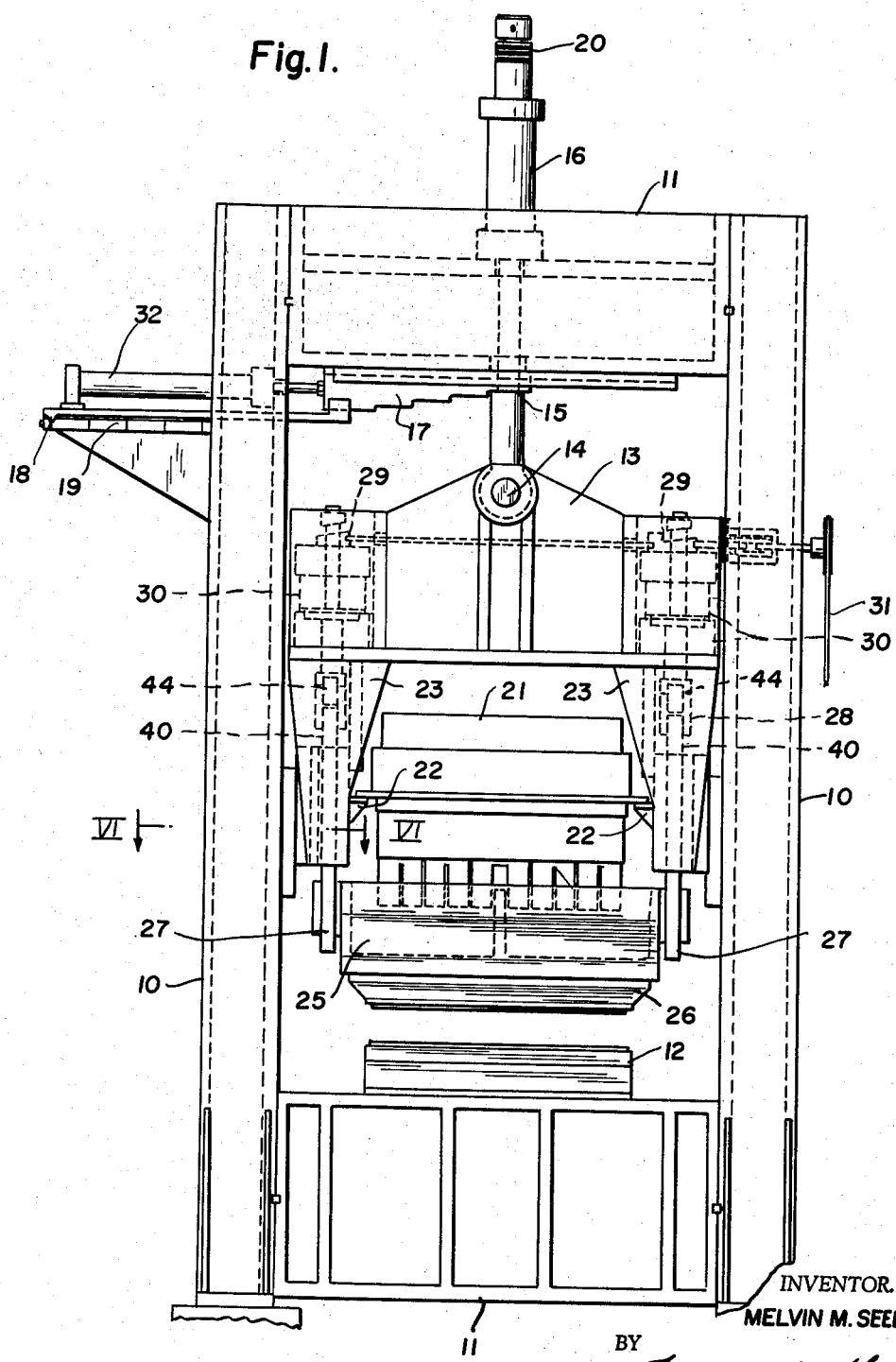

M. M. SEELOFF
GRATING WELDER 3,143,632

Filed March 12, 1962

INVENTOR.
MELVIN M. SEELOFF
BY Francis J. Klempay
his ATTORNEY

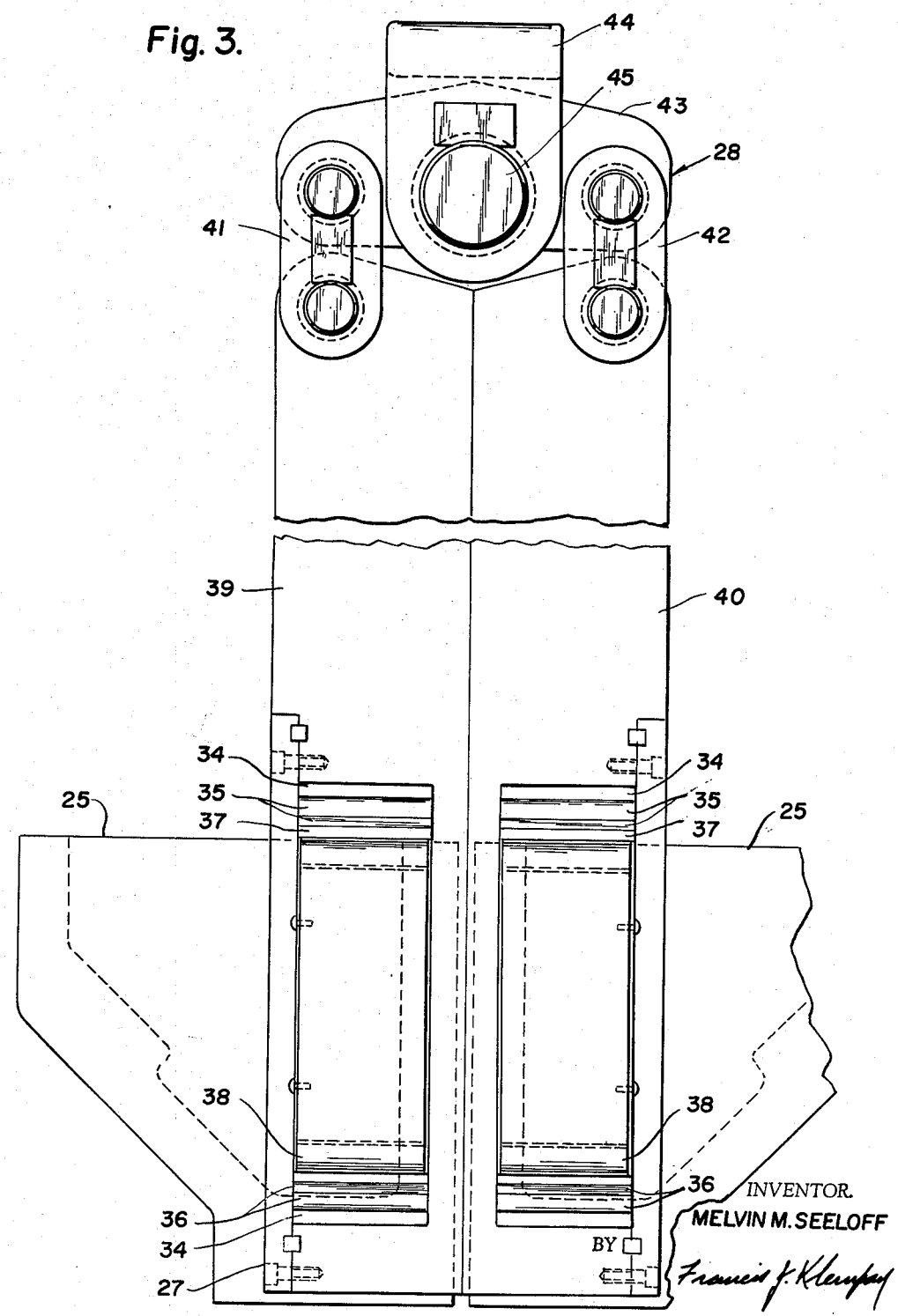

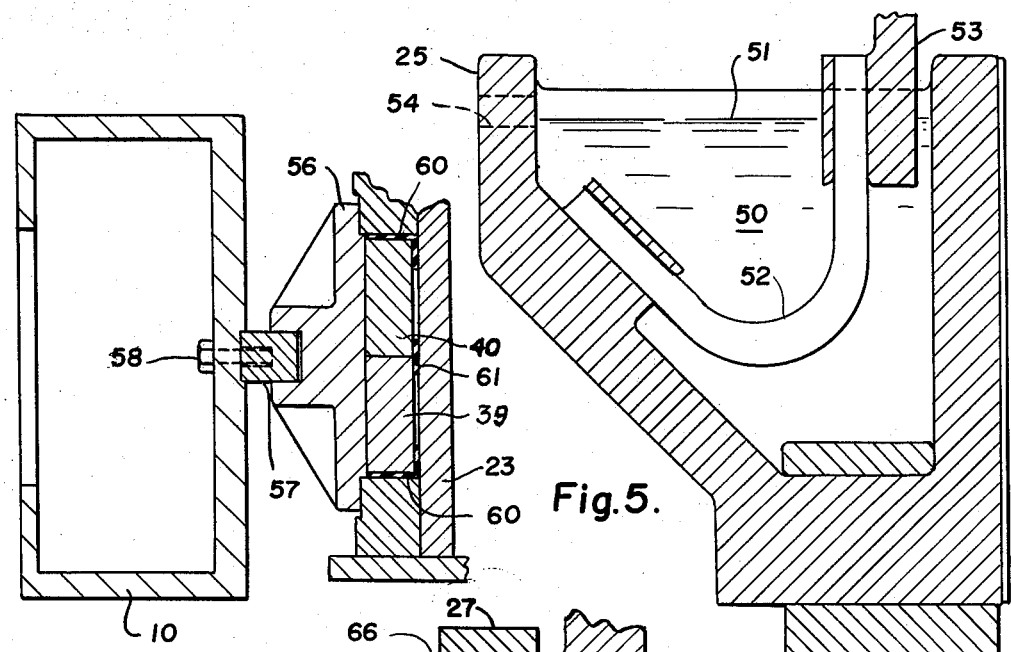
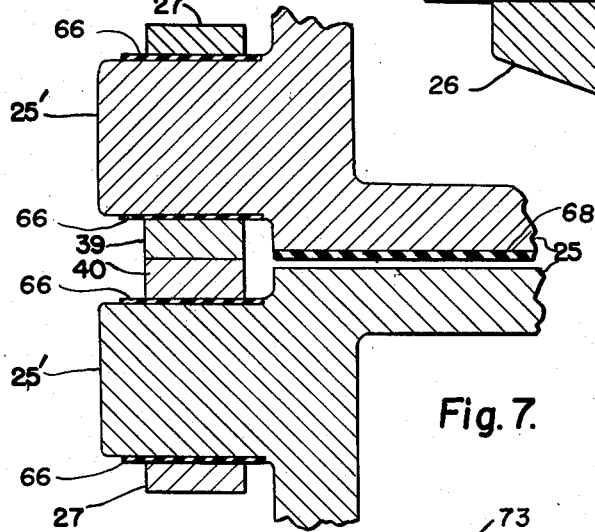
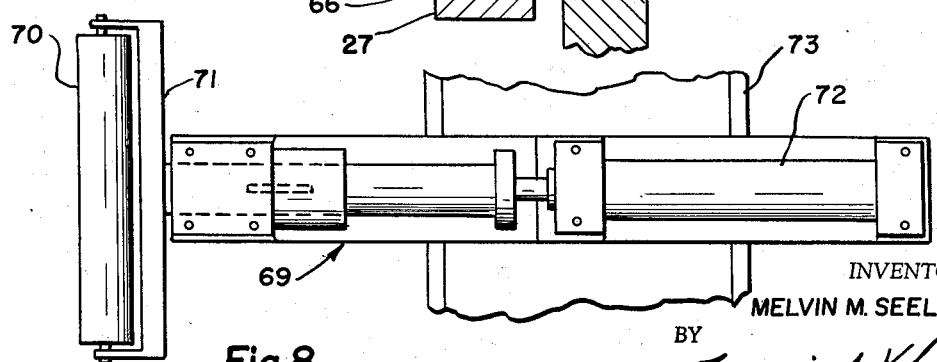
INVENTOR.
MELVIN M. SEELOFF
BY Francis J. Klempay
his ATTORNEY United States Patent Office 3,143,632
Patented Aug. 4, 1964

3,143,632
GRATING WELDER
Melvin M. Seeloff, Warren, Ohio, assignor to The Taylor-Winfield Corporation, Warren, Ohio, a corporation of Ohio
Filed Mar. 12, 1962, Ser. No. 178,845
11 Claims. (Cl. 219—78)

This invention relates to an electric welding machine and, more particularly, to a grating welder, and constitutes an improvement over that shown in U.S. Patent No. 2,269,091 dated January 6, 1942, assigned to the present assignee.

A disadvantage of the welding machine disclosed in said patent is that the heavy welding transformer is moved up and down on a sliding frame during welding operations, therefore imposing heavy loading, high inertia forces, and slow "follow-up" on the machine.

Another disadvantage is that equalized pressure on the welding dies throughout the entire area of the grating and sufficiently high welding pressures are not obtainable to give uniformity of weld as well as high welding currents throughout the entire welding area.

An object of the present invention is to provide a novel welding machine of the grating type which will overcome the above named disadvantages by stationarily mounting the welding transformer so as to eliminate abnormal loading that would otherwise result from reciprocating a heavy mass during welding operations.

Another object of the invention is to provide equalizing ram means on the main slide for the movable die to obtain equalized welding pressure on all bars of the grating so as to provide very strong welds of uniform character and high quality throughout the entire grating cross-section.

Another object of the invention is to obtain quick "follow-up" during the welding cycle.

Still another object is to provide effective cooling means for the transformer and secondary conductors to permit the use of very high welding currents.

Other objects and advantages will become more apparent from a study of the following description taken with the accompanying drawings wherein:

FIG. 1 is a vertical, elevational view of a grating welder embodying the principles of the present invention;

FIG. 3 is an enlarged, vertical, elevational view of one of the equalized ram assemblies supported on each end of the main slide 13;

FIG. 5 is a vertical, cross-sectional view through a fragmentary, left portion of the terminal 25 shown in FIG. 3;

FIG. 6 is an enlarged, cross-sectional view taken along line VI—VI of FIG. 1 illustrating how the equalizing ram bars are mounted in the slide housing;

FIG. 7 is an enlarged, cross-sectional view taken along line VII—VII of FIG. 4; and, FIG. 8 is an enlarged, plan view of the hold-down roll assembly shown in FIG. 2.

Figure 2:
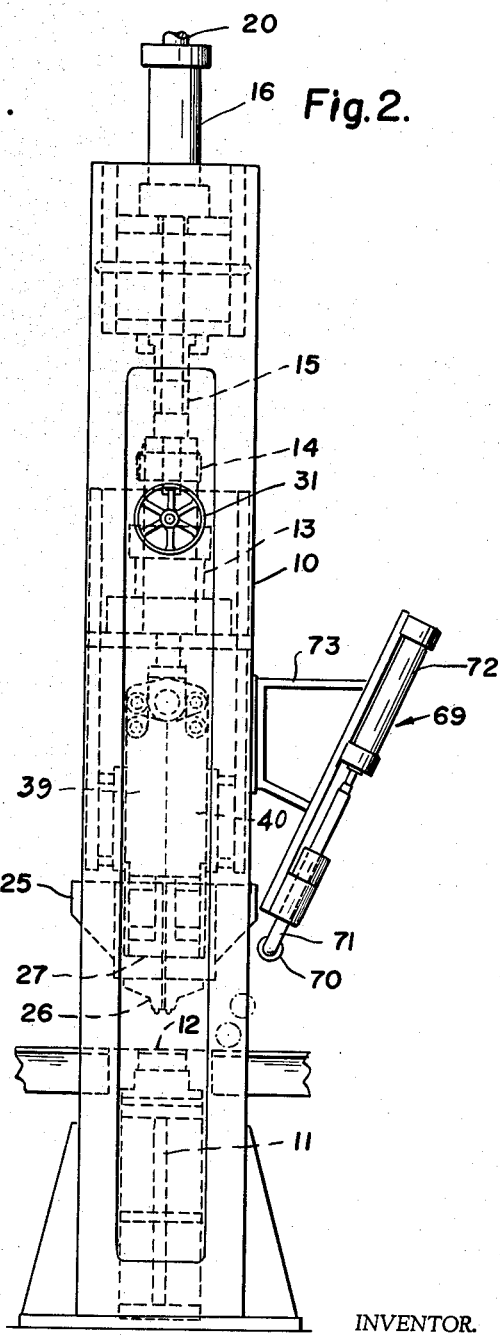
FIG. 2 is a side view of the welder shown in FIG. 1.

Referring more particularly to FIGS. 1 and 2 of the drawing, numeral 10 denotes side frames which are connected together at the top and bottom ends by cross frames 11 of heavy fabricated steel to provide a very strong rectangular frame construction. On the lower cross frame 11 is mounted a stationary lower die 12. A main slide 13 is vertically slidable with respect to the side frames 10 by providing suitable track means therebetween. Slide 13 is supported by pin 14 connected to rod 15 having a top end portion which extends upwardly through a high lift or retraction hydraulic cylinder 16. The purpose of cylinder 16 is for lifting the movable die 26 sufficiently high to enable installation or changing of the dies, or for maintenance purposes. Safety horse shoe blocks or shims 20 are provided at the top end portion of the rod of the retraction cylinder 16 and which are inserted during operation or during the maintenance period. Cylinder 16 also positions the main slide 13 at different heights for the major standard changes in depth of the grating longitudinal bearing bars by the use of a manual, hydraulic valve-controlled, stepped gauge block 17 having a position indicating pointer 18 rigidly secured thereto for indicating, on a scale 19, the position of the stepped gauge block. These bars determine the operation position of the main slide for different heights of grating. The welded steel grating comprises cross rods welded to longitudinal bearing bars.

It should be especially noted that the main slide 13 and its associated parts are held in the "up" position during welding and the slide 13 does not reciprocate during welding.

The transfomer 21 has a flange which is supported on brackets 22 integrally secured to depending portions 23 fixed to the slide 13 so as to rigidly mount the transformer 21 with respect to the slide 13. Therefore, the transformer does not move up and down with the welding stroke, thus avoiding machine loading, high inertia forces, and slow follow-up otherwise imposed by reciprocation of a heavy mass.

Figure 4:
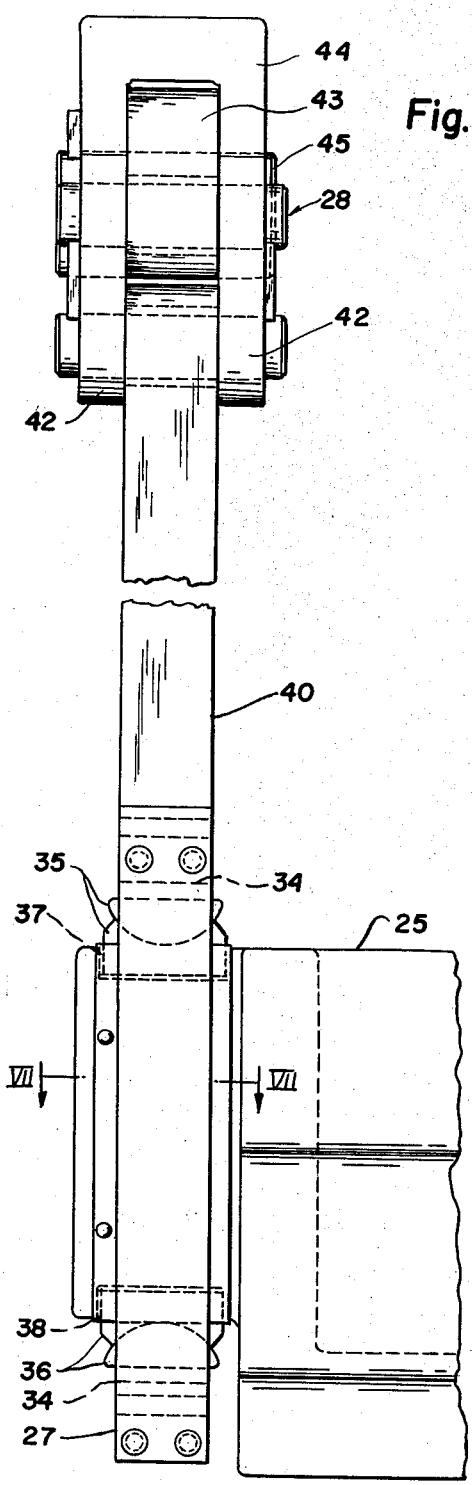
FIG. 4 is an end view of the ram assmebly shown in FIG. 3.

Carried in the main slide 13 are two equalized sub-slide assemblies 28, which are more clearly shown in FIGS. 3 and 4. These assemblies include heavy copper alloy beams or terminals 25 to which are attached the laminated current-carrying bands 52, as will appear more clearly in FIG. 5, which bands extend from the transformer secondary terminals 53. The welding die and mounting means 26 are secured to the bottom of terminals 25. Terminals 25 are well-shaped so as to contain the flexible current carrying bands 52 immersed in water 50 below level 51 for maximum heat dissipation and long life of the bands. An overflow outlet hole 54 is provided at the top portion of terminals 25.

Equalized welding forces are applied on the extreme ends of the terminals 25 by means of two hydraulic, welding pressure cylinders 30 which operate to provide approximately 1¾ inch welding stroke or other suitable length of stroke during welding operations. Each welding pressure cylinder 30 divides its load equally to the equalized ram bars 39 and 40 which, in turn, exert the welding force on terminals 25 to which the movable welding die is fastened. The weld stroke is always constant for any selected size of grating. As stated previously, however, the position of the main slide 13 is changed for each different size of grating.

A pull-chain micrometer adjustment operated by pull chain 31 permits minor vernier adjustment of the amount of set down of the cross bars of the grating by slight movement of wedges 29 to adjust the down stroke weld pressure cylinder 30. That is, it adjusts the down position, during welding, of the welding cylinder pistons for accurate control of the tops of the grating rods in reference to the tops of the grating bars.

As shown more clearly in FIGS. 3 and 4, the equalized ram assemblies supported on each end of the main slide 13, each comprises a pair of ram rods or bars 39 and 40 positioned in side by side relationship and being relatively slidable vertically. The top ends of ram bars 39 and 40 are connected, by pivotal links 41 and 42, to an equalizing link 43 which is supported by a supporting element 44 through pin 45.

FIG. 6 shows how ram bars 39 and 40 are slidably mounted in a housing comprising cover plate 56 and depending portions 23 of the main slide 13, which cover plate is slidably connected by slide key 57 and bolt 58 to side frame 10. Wear plates 60 and 61 are provided.

As indicated in FIGURE 4, the elements 44 on either side of the machine are connected to the operating rods of cylinders 30 whereby upon downward actuation of these cylinders the bars 39 and 40 will be moved downwardly to close the electrodes 26 onto the work and to apply welding force therethrough. The lower end portions of bars 39 and 40 are notched inwardly from their outwardly directed edges to receive lugs 25' extending integrally out of the ends of the terminals 25. See FIGURE 7. Cover plates 27 hold the lugs 25' in the notches. Terminals 25 are insulated from each other and from the bars 39 and 40 by the insulating sheets 66 and 68.

An important feature of the equalizing assembly is the provision of terminal equalizing shoes 35 and 36 having arcuate nesting surfaces and which are adapted to slide a very small amount on wear plates 34 abutting top and bottom surfaces of the notches referred to above to take care of any unequal set down of the terminal 25 during the welding operation. While links and pins of well known construction could have been used instead, these would be larger and not as rigid as the sliding arcuate shoe arrangement embodied in the present invention. The shoes are insulated from terminals 25 and lugs 25' by insulation 37 and 38.

The above described construction enables placement of the transformer 21 in the slide 13 directly above the welding operating level and permits a narrow machine parallel to the length of grating, providing greatest operator accessibility to the welding area. The wide frame, transverse to the grating, provides adequate space between frame sides and above the lower frame member for clearances for work handling equipment, for indexing the panel, loading the rods, etc.

By the term "follow-up" I mean that the movable welding electrodes move rapidly to effect a forging action immediately upon softening of the work by the resistance heating. By keeping the mass and inertia of the moving parts to a minimum this action is enhanced and good sound welds result. There is less mutilation of the work and less danger of burning.

It should be understood that lugs 25' of the terminals 25 are only loosely received in the notches of the bars 39 and 40 so that the terminals are free to have independent vertical movement at their ends. Such rocking movement is facilitated by the arcuate slip members 35 as will be apparent from FIGURE 4. Since the bars 39 and 40 exert the same welding force to each of the four ends of the two terminals 25 the welding force and current will be evenly distributed throughout the work even after the machine has incurred considerable wear.

Mounted on the exit side of the frame 10 is a hold-down roll assembly 69 comprising a hold-down roll 70 supported by rod 71 attached to the piston rod of a hydraulic cylinder 72. This cylinder is supported on a frame attached to bracket 73 which, in turn, is rigidly fastened to the side frame 10. The hold-down roll 70 is hydraulically actuated for high lift to make the welding area more accessible and to clear the indexing carriage when starting a new panel of grating. The dot and dash lines of circular outline show the positions to which roll 70 may be selectively lowered.

Thus it will be seen that I have provided an efficient, very rigid and accurate grating welder of such construction that the transformer may be adjustably mounted on a stationarily held main slide so as to avoid the necessity of reciprocating the transformer during the welding operation, thereby eliminating excessive loading, high inertia and slow follow-up attendant the reciprocation of a heavy mass, also there is provided a unique arrangement for cooling, in a water-filled well formed in the terminal, the current carrying bands of the transformer to enable conduction of higher welding currents for providing stronger welds; furthermore, the present invention provides an efficient, equalized pair of ram sub-assemblies to provide adequately high and uniform pressure throughout the entire grating area so as to increase the current carrying capacity as well as the uniformity of current distribution along the width of the grating and quality of the weld throughout the entire welding area, also to increase the speed of the welding strokes; furthermore, the present invention provides a construction requiring a minimum of maintenance and which provides a considerably longer life to the welding machine, as well as increased accessibility for enabling easier and quicker replacement of the dies or gratings and for maintenance purposes, thus greatly minimizing "down time" of the machine; furthermore, there is provided a structure of welder members for applying the pressure, which is sufficiently rigid that whether welding narrow or wide grating, the deflection is very low under maximum load; furthermore, there is provided a vernier adjustment by pull chain at the level of the operator, enabling him to observe the height of the rod as set down into the bars while the welding of the panel proceeds, and to make slight adjustments to keep this level just right and the attendant improvement in quality of the weld.

While I have illustrated and described a single specific embodiment of my invention, it will be understood that this is by way of illustration only, and that various changes and modifications may be made within the contemplation of my invention and within the scope of the following claims.

I claim:

1. A welding machine comprising a vertically mounted frame having, rigidly secured thereto, a stationary lower welding die, a main slide slidably mounted for vertical movement on said frame, means carried by said frame to move said main slide vertically, means to provide selective vertical adjustment thereof relative to the frame, a transformer rigidly supported by said slide, power actuated ram means mounted on said slide and vertically reciprocable therein, and a welding terminal secured to the bottom end of said ram means, a die secured thereto, whereby said last mentioned die is vertically reciprocable with respect to said stationary die to effect the welding operation without the necessity of reciprocating said transformer.

2. A welding machine as recited in claim 1 wherein said transformer includes a secondary having flexible current carrying bands, said terminal having a trough shaped portion filled with a cooling fluid in which said bands are immersed.

3. A grating welder comprising a vertically extending frame of rectangular outline comprising a pair of side frame members and a pair of cross frame members secured to the top and bottom ends thereof, a stationary die mounted on the bottom cross frame member, a main slide slidably supported by the top cross frame member for vertical movement and adjustably held in selected vertical positions relative thereto, vertically reciprocable ram means mounted on said main slide, current carrying terminal means mounted on the bottom of said ram means, a die attached to said terminal means for cooperation with said stationary die during the welding operation, a transformer carried by said slide and having its secondary connected to said terminal means, and hydraulic means suported on said slide for reciprocating said ram so as to move said movable die towards and away from said stationary die to effect welding.

4. A grating welder as recited in claim 3, further including flexible current carrying bands extending from the secondary of the transformer and connected to said terminal means, said terminal means being trough shaped and filled with a liquid in which said bands are immersed to effect cooling thereof.

5. A grating welder as recited in claim 3 wherein said ram means comprises a pair of equalizing ram bar assemblies suspended from opposite side portions of said main slide, each ram assembly comprising a pair of vertically extending ram bars in closely spaced relationship, an equalizing bar extending above the top ends of said pair of ram bars and a pair of pivotal links mounted on the respective ends of said equalizing bar and which are connected to the top ends of said respective ram bars, a support element on said main slide for pivotally supporting the central portion of said equalizing bar within said main slide, said current carrying terminal means being rigidly connected to the bottom ends of said bars, and said movable dies being connected to the bottom ends of said terminal means.

6. A grating welder as recited in claim 5 wherein integral portions of said terminal means are connected to said bars by yieldable means to compensate for irregularities in pressure on the down stroke of the movable die.

7. A grating welder as recited in claim 6 wherein said yieldable means comprises vertically spaced pairs of arcuately shaped, nesting shoes slidably mounted on laterally extending wear plates to effect said compensation.

8. A grating welder as recited in claim 3, together with a hold-down roll mounted for substantially vertical movement by hydraulic means at the exit portion of the frame and arranged so as to be lifted to a high position away from the work when not in use.

9. A grating welder as recited in claim 5, together with a wedge block at the top of each of said pair of equalizing ram bar assemblies, a welding pressure cylinder associated with each of said blocks, and adjusting means for laterally moving said wedge blocks to provide a vernier adjustment of the down position of the welding pressure cylinder pistons for accurate control of the tops of the grating rods in reference to the top of the grating bars associated with said respective dies.

10. A grating welder according to claim 3 further including power means carried by said top cross frame to raise and lower said main slide; and means to limit the upward movement of said main slide upon actuation of said ram means comprising an upwardly extending abutment on said main slide, and a horizontally disposed gauge bar slidably mounted on said top cross frame and having stepped portions of different thicknesses to be selectively engaged by said abutment to thereby adjust the upward limiting position of said main slide.

11. A grating welder according to claim 10 further including a hydraulic cylinder mounted on one of said side frames to slidably move said gauge bar to a selected position.

References Cited in the file of this patent

UNITED STATES PATENTS

| | | |
|---|---|---|
| 1,310,127 | Merrill | July 15, 1919 |
| 2,710,903 | Seeloff et al. | June 14, 1955 |
| 2,922,025 | Fullerton et al. | Jan. 19, 1960 |
| 2,961,529 | Young | Nov. 22, 1960 |